UNITED STATES PATENT OFFICE.

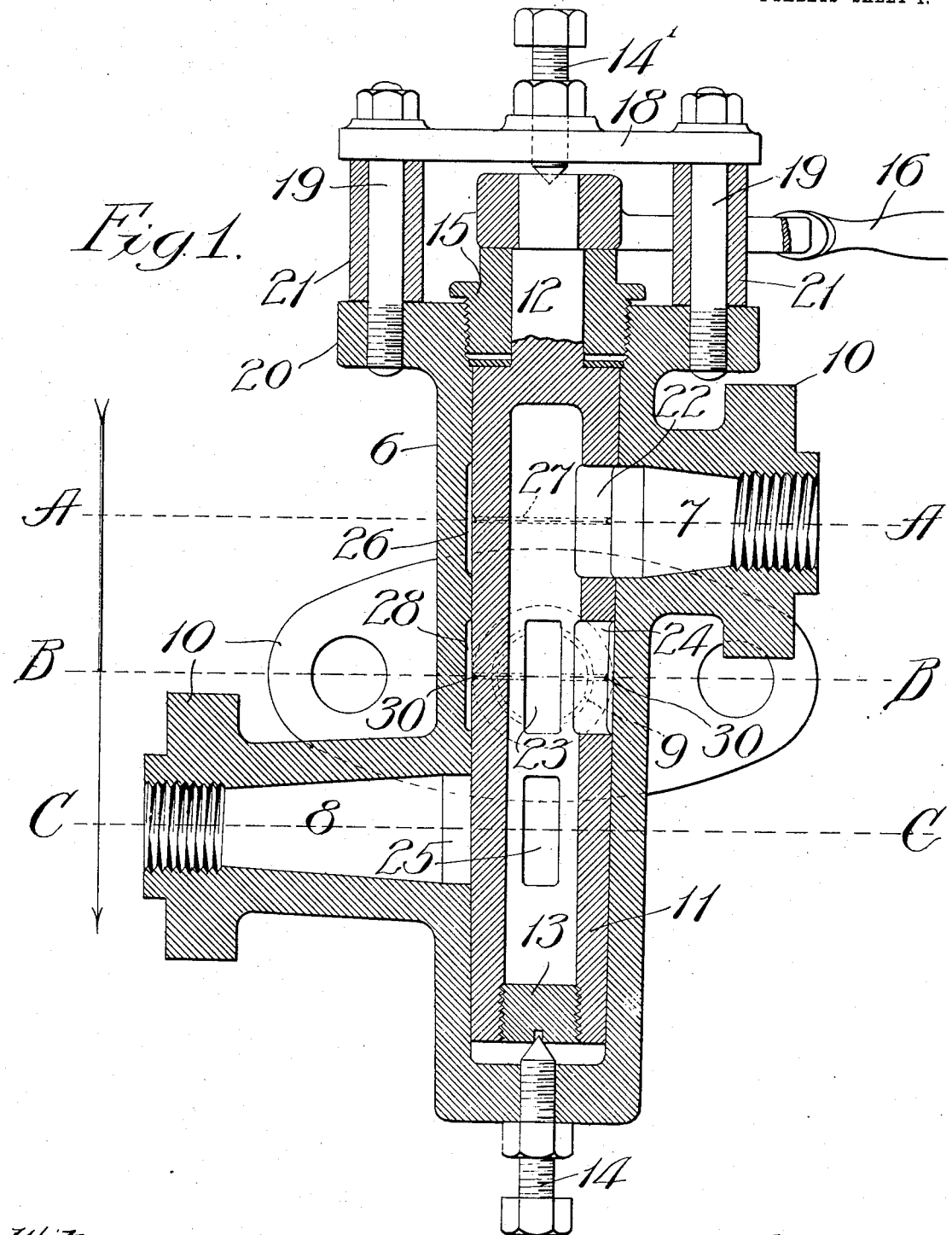

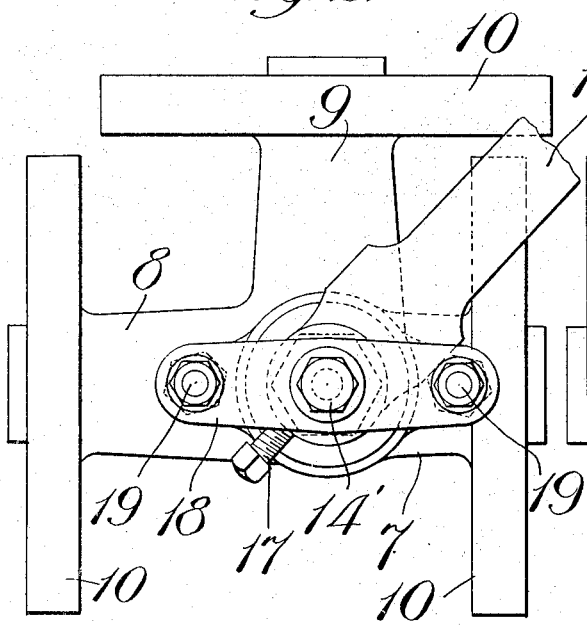
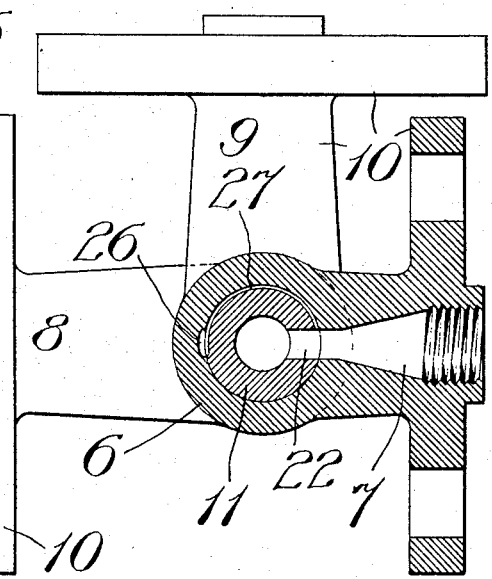
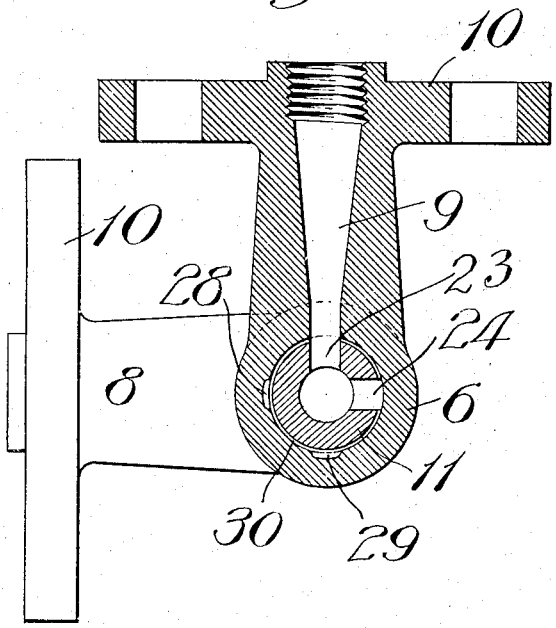
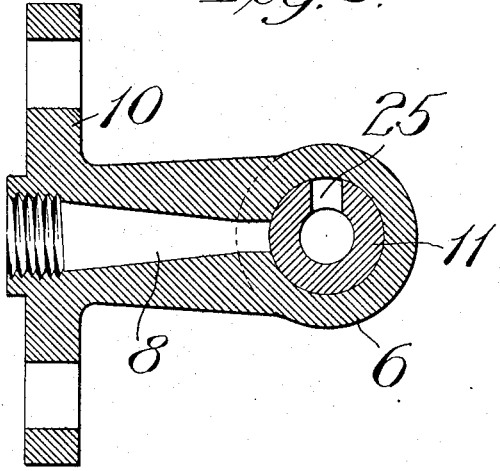

JAMES McGILLIVRAY, OF SOUTH CHICAGO, ILLINOIS.

VALVE DEVICE.

No. 929,238.  Specification of Letters Patent.  Patented July 27, 1909.

Application filed March 17, 1909. Serial No. 484,053.

*To all whom it may concern:*

Be it known that I, JAMES McGILLIVRAY, a citizen of the United States, residing at South Chicago, in the county of Cook and State of Illinois, have invented a new and useful Improvement in Valve Devices, of which the following is a specification.

My present invention is in the nature of an improvement on the valve-device which forms the subject of Letters Patent No. 781,897, granted to me on the 7th day of February, 1905, that construction being more especially adapted for controlling high-pressures—say 1500 pounds to the square inch, and over—and to that end involving a pair of similar hollow rotary valves balanced by the admission of counter-pressure to their interiors through by-passes, and connected together by operating means to adapt them to be simultaneously actuated.

The primary object of my improvement is to provide a construction of valve-device involving a single hollow valve and adapted for controlling relatively lower pressures, thereby enabling an equally effective, but cheaper, device to be furnished to users where such lower pressures are required to be controlled.

In the accompanying drawings, Figure 1 is a view in vertical sectional elevation of a valve-device of my improved construction; Fig. 2 is a partly-broken top plan view of the same, and Figs. 3, 4 and 5 are sections, taken, respectively, on the lines A—A, B—B, and C—C, Fig. 1.

The casing 6, which is open at one end and closed at its opposite end, is provided with diametrically-opposite ports 7 and 8, shown as internally-threaded nozzles, respectively near the opposite ends of the casing, for coupling with one, as the nozzle 7, a pressure-inlet pipe and with the other, as the nozzle 8, an outlet-pipe; and in the plane between these ports, but at a right-angle thereto, the casing is provided with a nozzle-like port 9. Each nozzle has formed upon it, near its outer end, a flange 10 through which to secure it to a similar flange on the pipe (not shown) to which it is coupled. The interior of the casing is slightly tapered toward its closed end to be fitted by a correspondingly-tapered hollow rotary valve 11 carrying a stem 12 on its outer, closed end, and closed at its opposite end by a screw-plug 13 at which it is adjustably supported by a set-screw 14 working in the adjacent end of the casing. A threaded collar 15 is screwed into the casing about the valve-stem 12 to confine it, and beyond the collar that stem is shouldered, as shown, for seating about it the socket-end of an operating-handle 16 secured in place by a set-screw 17 through the socket. A bearing-bar 18 is securely supported to extend across the center of the valve-stem on opposite posts 19 screwed into ears 20 which project laterally from the open end of the casing, these posts being surrounded by spacing-thimbles 21; and the bar 18 affords a bearing for a set-screw $14^1$ working centrally against the end of the valve-stem, whereby any wear on the valve and the casing may be taken up, on loosening the set-screw 14, by operating the set-screw $14^1$ to properly seat the valve in its casing.

In the valve is a port 22 to register with the inlet-port 7, a port 23 and at a right-angle thereto a port 24 to register with the port 9; and the valve also contains a port 25 to register with the port 8. In the position of the valve represented in Fig. 1 the pressure-medium enters it through the ports 7 and 22 and passes through the hollow valve to and discharges through the ports 23 and 9 to the point where it performs work. Upon turning the valve through a quarter-turn, the port 22 is taken out of registration with the port 7, and the port 23 is taken out of registration with the port 9, while the ports 24 and 25 are brought coincident, respectively, with the ports 9 and 8, thereby shutting off the pressure-supply to the valve and permitting the pressure to return from the point of performing its work and discharge through the ports 9 and 24 into the valve and out of the latter through the ports 25 and 8.

In the inner wall of the casing is provided, at a point diametrically opposite the port 7, a pocket 26, the area of which corresponds, at least approximately, with that of said port, and which is connected therewith by a circular (or, as shown, semi-circular) recess 27 formed about the valve. Similar pockets 28 and 29 are formed in the inner wall of the casing in positions at right-angles to each other in the plane of the discharge and return port 9, with which each corresponds, at least approximately, in area; and they are connected by a circular recess 30 formed about the valve. These pockets are provided for balancing the valve to prevent binding thereof under the pressure-force exerted against it, and thus render the more easy its operation by turning the handle 16. Thus, with the ports 7 and 22 in registration, the pressure-medium fills the pocket 26 through the recess 27 and, both ports being of the same area, the pressure is balanced against the valve, preventing binding thereof. This effect is supplemented when the pressure is discharging to the work-performing point through the ports 23 and 9, since a portion of the pressure-medium will flow by way of the closed port 24 through the recess 30 and fill the pocket 28 and also the pocket 29, thereby balancing the valve in the direction transversely of the port 9 and also against the back-pressure from the work; and when the port 24 registers with the port 9, to permit the return-flow of the pressure-medium, its pressure against the inner wall at the rear part of the valve will be balanced by the counter-pressure in the pocket 29 which has entered by way of the recess 30. The resistance to the pressure discharging through the ports 23 and 9 of the work being performed, renders desirable the balancing of the valve at the point 29, and the position of the port 24, when closed, renders such balancing desirable at the point 28, since otherwise the pressure exerted against the casing through the port 24 would tend to bind the valve.

It should be remarked that the recesses 27 and 30 are provided in the valve for the sake of convenience in manufacture, instead of being provided in the inner wall of the casing, which would amount to the same thing but render the manufacture more difficult.

What I claim as new and desire to secure by Letters Patent is—

1. A balanced valve-device of the character described, comprising, in combination, a casing provided with an inlet-port and an outlet-port and in the plane between the two with a discharge and return port, pockets provided in the inner casing-wall relative to said inlet port and said discharge and return port, a hollow valve rotatably seating in the casing and containing a port to register with said inlet-port, a port to register with said outlet-port, and ports to register successively with said discharge and return port, and recesses extending about the valve for connecting said inlet-port and said discharge and return port with their respectively coöperating pockets, for the purpose set forth.

2. A balanced valve-device of the character described, comprising, in combination, a casing provided on opposite sides and toward opposite ends respectively with an inlet-port and an outlet-port, and in the plane between and at right-angles thereto with a discharge and return port, a pocket formed in the casing-wall opposite and corresponding in area with the inlet-port, similar pockets in the casing-wall respectively opposite and at a right-angle to said discharge and return port, a hollow valve rotatably seating in the casing and containing a port to register with said inlet-port, a port to register with said outlet-port and ports to register successively with said discharge and return port, a recess extending about the valve for connecting said inlet-port and pocket opposite thereto, and a recess about the valve for connecting said return and discharge port and the pockets coöperating therewith, for the purpose set forth.

3. A balanced valve-device of the character described, comprising, in combination, a casing provided with an inwardly-tapering interior, an inlet-port and an outlet-port in the casing and a discharge and return port therein in the plane between the two, nozzle-like extensions of said ports provided with coupling-flanges, pockets provided in the inner casing-wall relative to said inlet port and said discharge and return port, a hollow tapering handle-equipped valve rotatably and adjustably seating in the casing and containing a port to register with said inlet-port, a port to register with said outlet-port and ports to register successively with said discharge and return port, and recesses extending about the valve for connecting said inlet-port and said discharge and return port with their respectively coöperating pockets, for the purpose set forth.

JAMES McGILLIVRAY.

In presence of—
J. G. ANDERSON,
R. A. RAYMOND.